United States Patent
Konishi

(10) Patent No.: US 11,029,507 B2
(45) Date of Patent: Jun. 8, 2021

(54) OBSERVATION DEVICE

(71) Applicant: OLYMPUS CORPORATION, Hachioji (JP)

(72) Inventor: Hirokazu Konishi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/001,575

(22) Filed: Jun. 6, 2018

(65) Prior Publication Data

US 2018/0356622 A1    Dec. 13, 2018

(30) Foreign Application Priority Data

Jun. 12, 2017 (JP) .............................. JP2017-114853

(51) Int. Cl.
*G02B 21/02* (2006.01)
*G02B 21/36* (2006.01)

(52) U.S. Cl.
CPC ........... *G02B 21/025* (2013.01); *G02B 21/02* (2013.01); *G02B 21/36* (2013.01); *G02B 21/361* (2013.01)

(58) Field of Classification Search
CPC .. G02B 15/177; G02B 15/173; G02B 13/009; G02B 13/22; G02B 13/0045; G02B 27/0025; G02B 13/006; G02B 15/20; G02B 15/17; H04N 5/2254; H04N 5/23212; H04N 5/23296
See application file for complete search history.

(56) References Cited

U.S. PATENT DOCUMENTS

| | | | |
|---|---|---|---|
| 3,353,891 A * | 11/1967 | Rosenberger | .......... G02B 15/14 359/380 |
| 6,075,646 A | 6/2000 | Suzuki | |
| 2003/0165021 A1 | 9/2003 | Kawasaki | |
| 2006/0092504 A1 | 5/2006 | Hayashi | |
| 2015/0002943 A1* | 1/2015 | Ono | .......... G02B 9/34 359/684 |

FOREIGN PATENT DOCUMENTS

| | | |
|---|---|---|
| JP | H08190056 A | 7/1996 |
| JP | 2003066333 A | 3/2003 |
| JP | 2006084825 A | 3/2006 |
| JP | 2007213103 A | 8/2007 |

* cited by examiner

*Primary Examiner* — Farhan Mahmud
(74) *Attorney, Agent, or Firm* — Holtz, Holtz & Volek PC

(57) ABSTRACT

An observation device 100 includes an objective 2a, camera 3, an observation scope changing device, and a control device. The objective 2a having from 4× to 20× and including a positive lens group forms an image with light from sample S. The lens group includes a single lens L1 having a concave surface on an object side and a variable aperture diaphragm 4. The camera 3 converts the image into an image signal. The observation scope changing device performs electronic scaling on the image signal and performs an observation scope changing process. The control device controls the diaphragm 4 in accordance with the observation scope changing process. The observation device 100 satisfies a conditional expression is satisfied, $$3 \leq |fa/fGS| \leq 10$$

where fa is a focal length of single lens L1 and fGS is a focal length of a lens group from an object plane to the diaphragm 4.

7 Claims, 10 Drawing Sheets

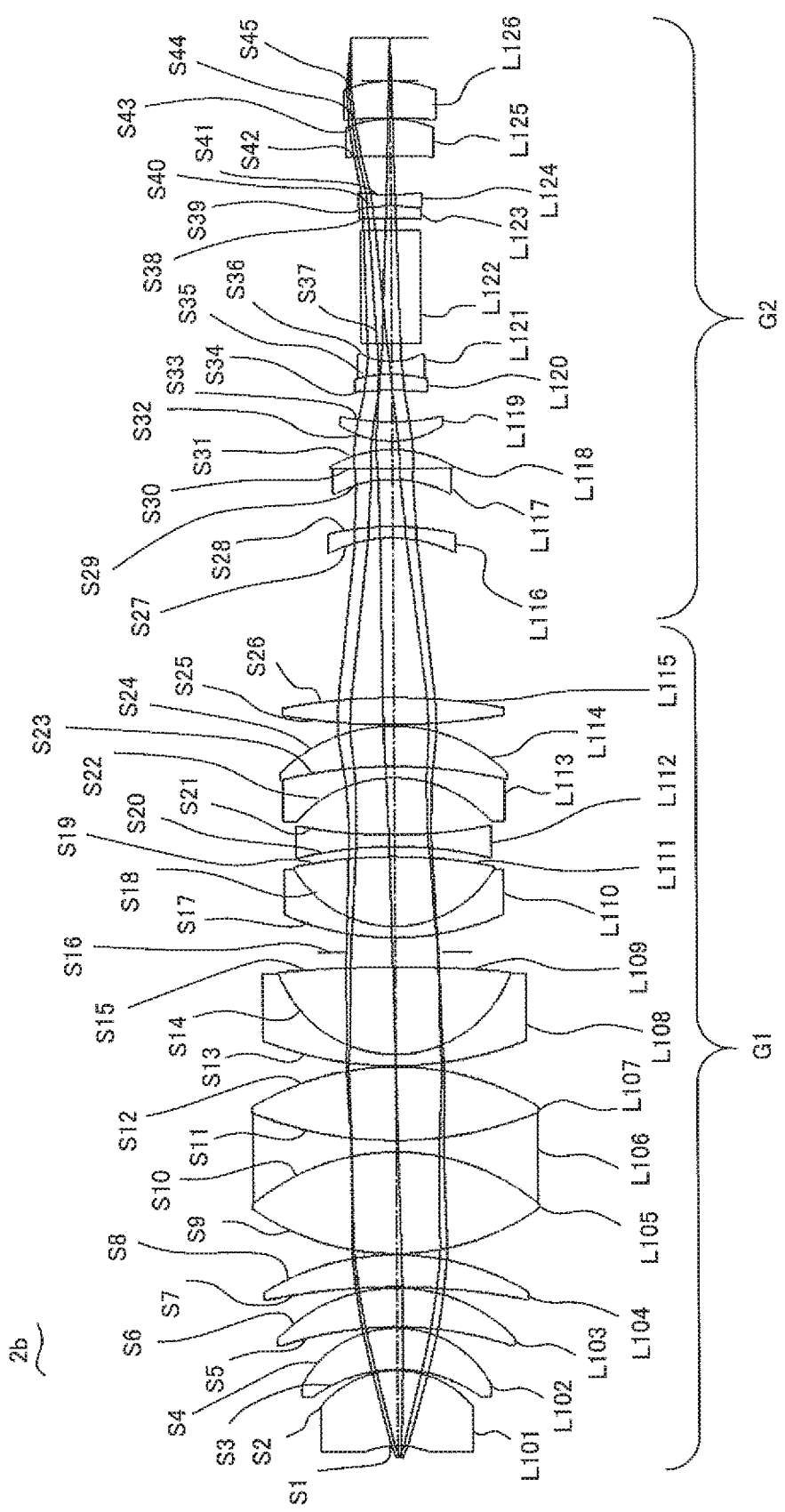
F I G. 9

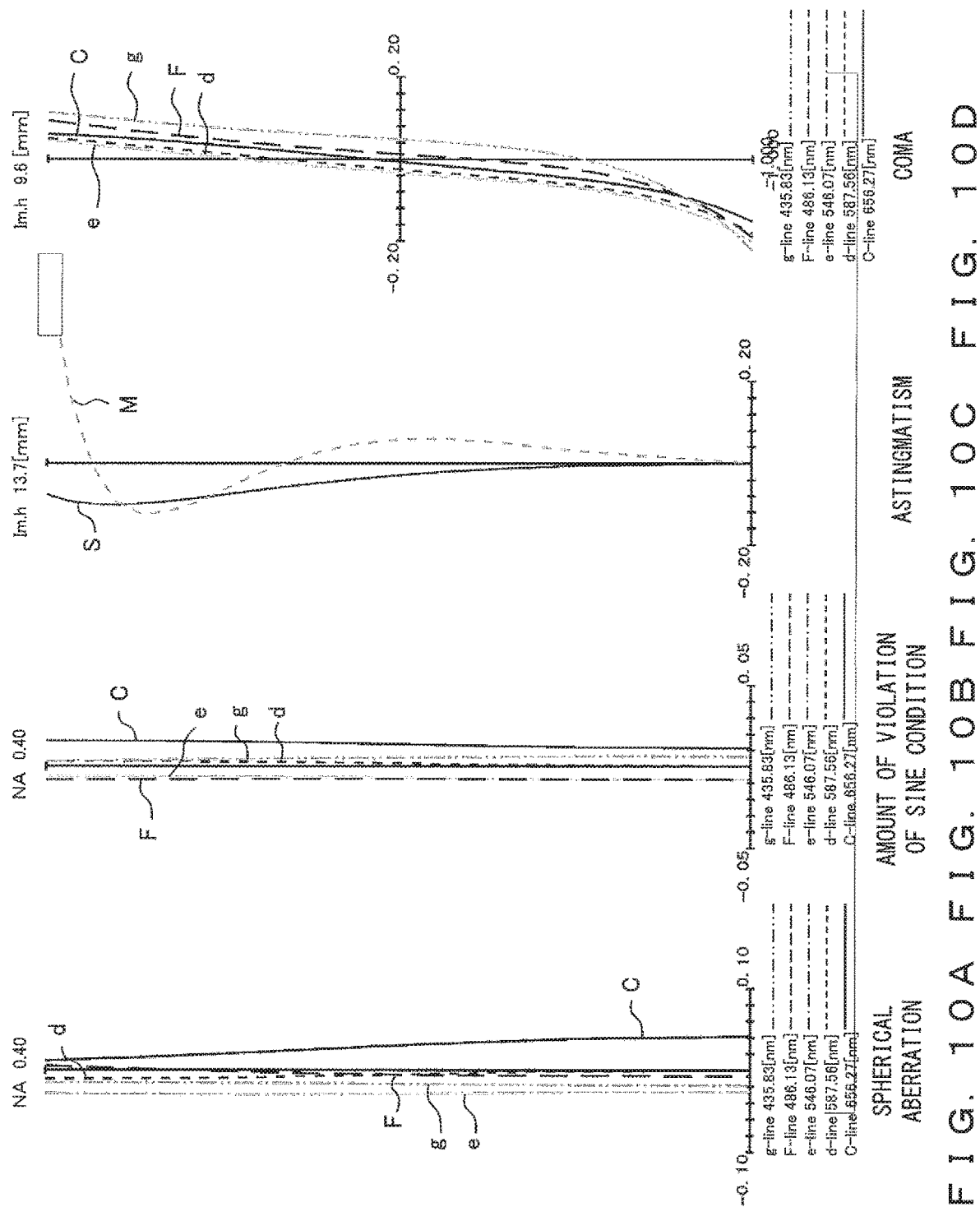

OBSERVATION DEVICE

CROSS REFERENCE TO RELATED APPLICATIONS

This application is based upon and claims the benefit of priority from prior Japanese Patent Application No. 2017-114853, filed Jun. 12, 2017, the entire contents of which are incorporated herein by this reference.

BACKGROUND OF THE INVENTION

Field of the Invention

The present invention is related to an observation device that observes a sample.

Description of the Related Art

Various methods have conventionally been employed for a configuration that changes the observation scope of an observation device that is used for observing a sample. The following methods have been employed for microscopes. For example, a revolver having a plurality of objectives with different magnifications revolves to change the observation scope. In another example, the objective itself has a zoom magnification function, which changes the observation scope (Japanese Laid-open Patent Publication No. 2003-66333 and Japanese Laid-open Patent Publication No. 2007-213103). In another example, the afocal portion between the objective and the imaging lens has a zoom scaling function, which changes the observation scope (Japanese Laid-open Patent Publication No. 2006-84825). In another example, the optical path is segmented, each segment has a different projection magnification, and the segments are appropriately selected to change the observation scope (Japanese Laid-open Patent Publication No. 8-190056).

A method is also known, in which the finder optical system etc. has a zoom scaling function and a focus switching function, which change the observation scope.

Another method such as electronic scaling (digital zooming, electronic zooming, etc.) is also known, in which part of image information, resulting from a detection unit such as an image pickup element converting optical information into an electric signal, is extracted to change the observation scope.

SUMMARY OF THE INVENTION

An observation device according to an aspect of the present invention is an observation device that observes an object, the observation device including an objective, an image pickup device, an observation scope changing device, and a control device. The objective forms an image with light from the object. The objective includes a lens group and has a magnification equal to or higher than 4× and equal to or lower than 20×. The lens group has a positive refractive power and including, in order starting from an object side, a single lens having a concave surface on an object side and a variable aperture diaphragm configured to change a numerical aperture on an exit side of the objective. The image pickup device converts an image of the object into an image signal. The image of the object is formed by the objective. The observation scope changing device performs electronic scaling on the image signal obtained by the image pickup device and thereby performs an observation scope changing process of changing an observation scope. The control device controls the variable aperture diaphragm in accordance with the observation scope changing process. In the observation device, a conditional expression is satisfied, $$3 \le |fa/fGS| \le 10$$

where fa is a focal length of the single lens and fGS is a focal length of a lens group from an object plane to the variable aperture diaphragm.

BRIEF DESCRIPTION OF THE DRAWINGS

The present invention will be more apparent from the following detailed description when the accompanying drawings are referenced.

FIG. 9 is a sectional view of an objective with the diaphragm diameter of the variable aperture diaphragm narrowed to the maximum extent permitted by the structure according to example 2;

FIG. 10A is a spherical aberration diagram with the diaphragm diameter of the variable aperture diaphragm narrowed to the maximum extent permitted by the structure in the objective according to example 2;

FIG. 10B is a sine condition violation amount diagram with the diaphragm diameter of the variable aperture diaphragm narrowed to the maximum extent permitted by the structure in the objective according to example 2;

FIG. 10C is an astigmatism diagram with the diaphragm diameter of the variable aperture diaphragm narrowed to the maximum extent permitted by the structure in the objective according to example 2; and FIG. 10D is a comatic aberration diagram with the diaphragm diameter of the variable aperture diaphragm narrowed to the maximum extent permitted by the structure in the objective according to example 2.

DESCRIPTION OF THE EMBODIMENTS

Figure 1:
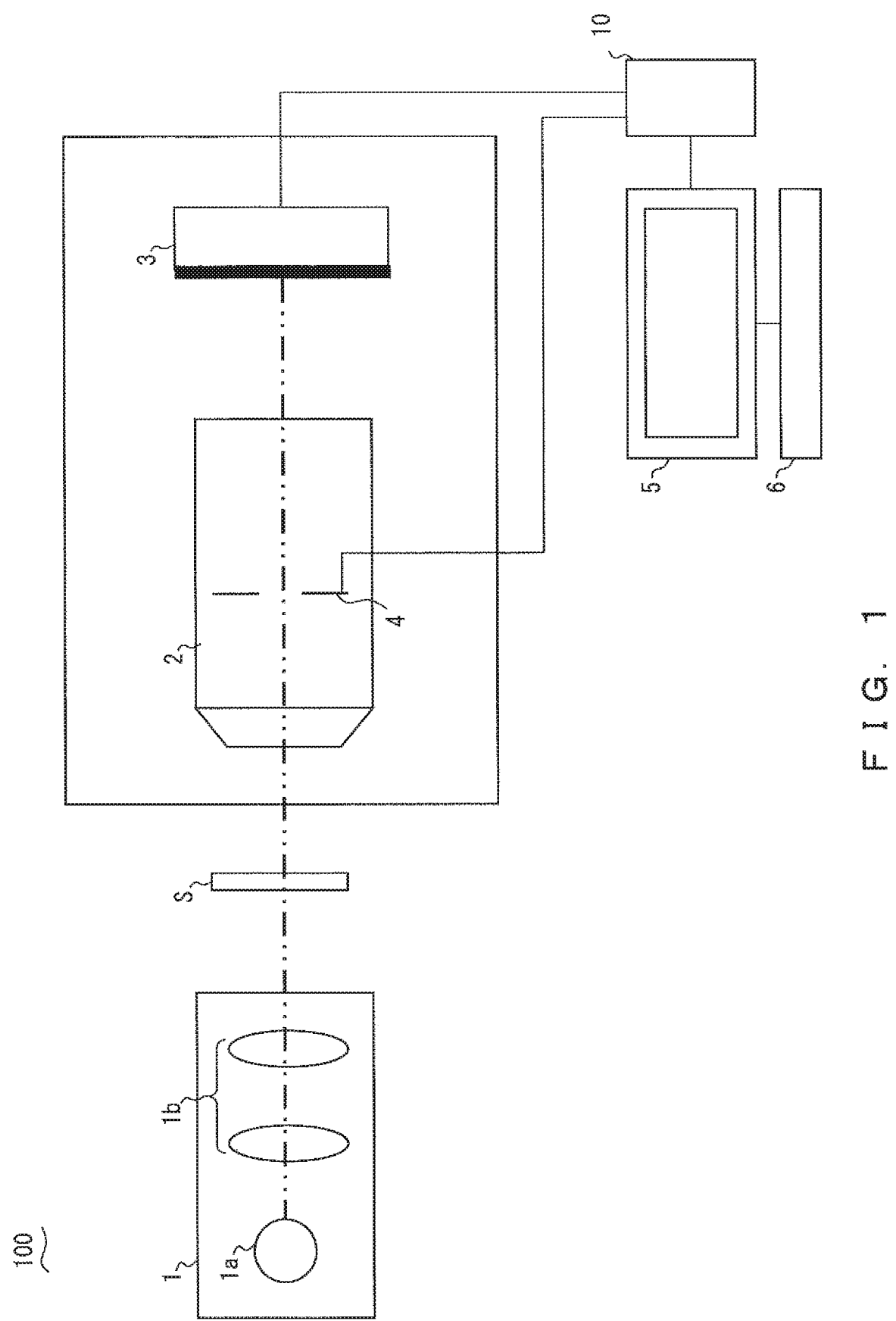
FIG. 1 illustrates a configuration of an observation device according to an embodiment.

A configuration that changes the observation scope by driving part of the optical system or by performing optical path switching can change the observation scope by a large margin while maintaining necessary observation image performance. Meanwhile, such a configuration requires the provision of a mechanism of mechanically driving a lens group, which tends to be bulky and heavy, and a plurality of optical paths, and this often makes the entire device larger. In addition, observations take a longer time because of the operations of driving the lens group and switching between the optical paths.

Also, the configuration that performs electronic scaling, in which part of image information is extracted to change the observation scope, does not require mechanical driving, leading to a smaller size of the device and a higher speed of observation. Meanwhile, such a configuration involves a problem in which the performance of the optical system and the image pickup element that are used reduces a margin by which the observation scope can be changed while maintaining necessary observation image performance.

In view of the above, it is an object of the embodiments to provide an observation device that can change the observation scope by a large margin and at a high speed while maintaining necessary observation image performance.

Hereinafter, explanations will be given for an observation device according to an embodiment of the present invention by referring to the drawings.

FIG. 1 illustrates a configuration of an observation device 100 according to an embodiment.

The observation device 100 includes a light source unit 1, an objective 2, a camera 3, a monitor 5, an input device 6, and a control device 10. Sample S is fixed to a stage etc. (not illustrated).

The light source unit 1 includes a light source 1a that outputs illumination light for illuminating sample S and lens group 1b that irradiates sample S with that illumination light.

The objective 2 receives light from sample S, which is an object, and forms an image in the camera 3. The objective 2 includes a variable aperture diaphragm 4 such as aperture blades etc. that can change the diaphragm diameter to change the numerical aperture on the exit side of the objective 2. The objective 2 also has a lens group that guides the light received from sample S and forms an image in the camera 3. A specific configuration of the objective 2 will be described later.

The camera 3 is arranged at the image forming position of the objective 2, and detects light through an image pickup element. The camera 3 converts the information of the detected light into an image signal, and transmits the image signal to a control device 10.

The monitor 5 is a display medium that displays, as an image, the image signal received from the control device 10.

The control device 10 controls the constituents of the observation device 100 on the basis of an instruction from the input device 6 and a program. The control device 10 includes, for example, a processor and a memory, and the processor may operate as each constituent element shown in FIG. 2 by executing a program loaded in the memory.

Figure 2:
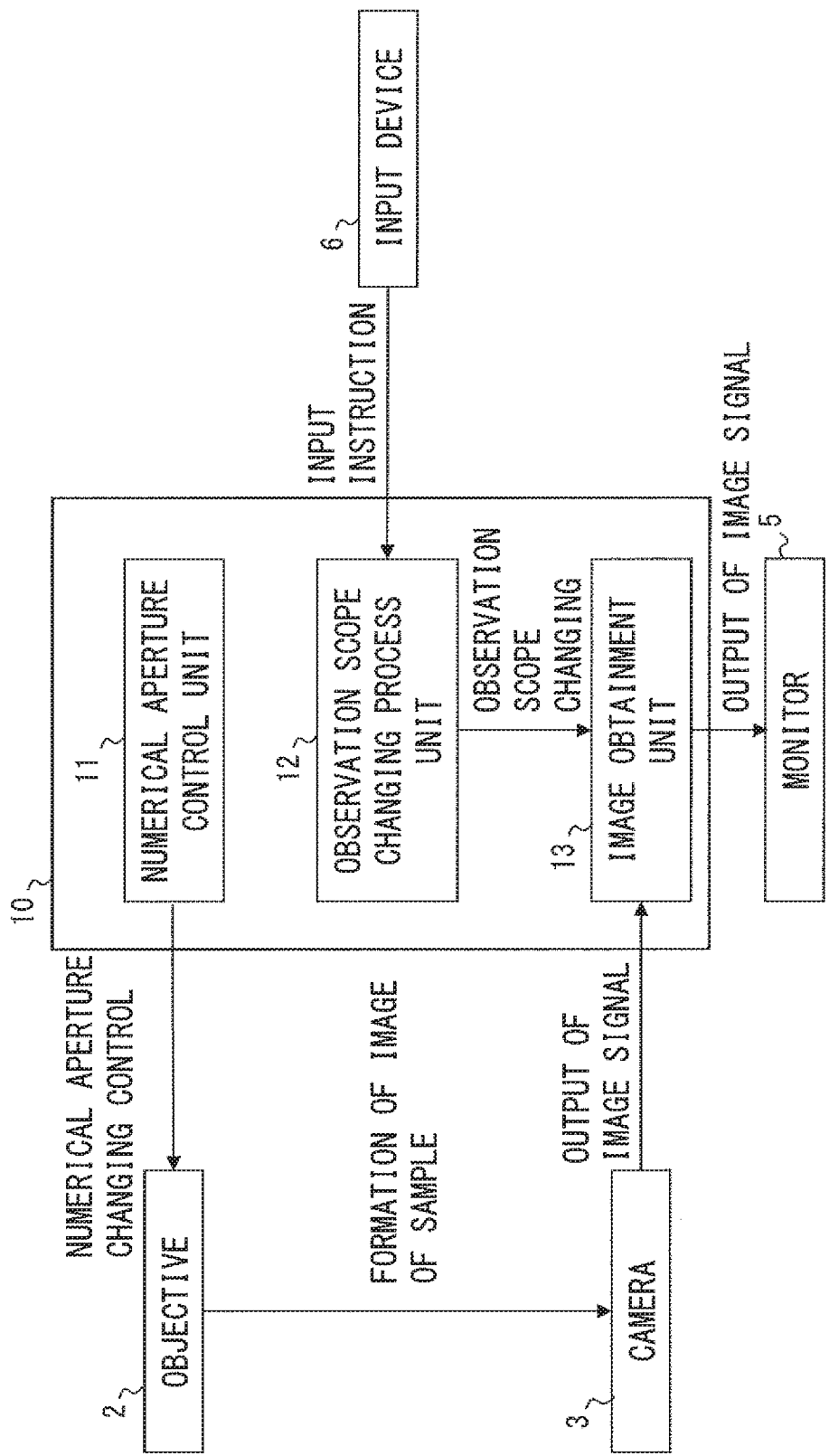
FIG. 2 illustrates a functional configuration of a control device.

FIG. 2 illustrates a functional configuration of the control device 10. By referring to FIG. 2, explanations will be given for the control performed by the control device 10. The control device 10 includes a numerical aperture control unit 11, an observation scope changing process unit 12 and an image obtainment unit 13.

The image obtainment unit 13 receives an image signal obtained through a conversion performed by the camera 3. The image obtainment unit 13 also provides an external output based on an image signal in the control device 10. In the present embodiment, the image obtainment unit 13 outputs an image signal to the monitor 5.

The observation scope changing process unit 12 performs an observation scope changing process on an image signal that the camera 3 obtains from the image obtainment unit 13. An observation scope changing process changes the position (the position on the X-Y plane) and the size of a scope over which an image is displayed when that image is to be displayed. Note that a scope over which an image is displayed will also be referred to as an observation scope hereinafter. An observation scope changing process is performed when an electronic scaling process, in which an image signal is electrically extracted, is performed. For example, the observation scope changing process unit 12 enlarges and extracts a specific scope of image signals through an electronic scaling process, and thereby generates image signals having that scope as an observation scope. The generated image signals are output from the image obtainment unit 13, and thereby displayed on the monitor 5 in the form of an image. An observation scope changing process may be performed on the basis of an instruction (instruction specifying the position and the electronic scaling ratio) input from the input device 6. Note that a scaling ratio at which an electronic scaling process changes the scope will be referred to as an electronic scaling ratio. An electronic scaling ratio represents an enlargement ratio with respect to the size of the original observation scope of an image signal generated by the image pickup element of the camera 3, the size being treated as a scaling of 1×. That is, the electronic scaling ratio can be calculated by (square root of an area size of the original observation scope)/(square root of an area size of the extracted observation scope).

The numerical aperture control unit 11 performs control in which the diaphragm diameter of the variable aperture diaphragm 4 included in the objective 2 is changed. By changing the diaphragm diameter of the variable aperture diaphragm 4, the numerical aperture on the exit side of the objective 2 is changed. Hereinafter, control of changing the diaphragm diameter of the variable aperture diaphragm 4 performed by the numerical aperture control unit 11 will also be referred to as numerical aperture changing control.

Also, numerical aperture changing control is performed by the numerical aperture control unit 11 in response to an observation scope changing process performed by the observation scope changing process unit 12. More specifically, the variable aperture diaphragm 4 is controlled in such a manner that an image has resolution necessary to display, on the monitor 5, the image signals extracted through the observation scope changing process, and thereby the resolution defined by the optical system guiding the light in the objective 2 (the resolution will also be referred to as the resolution of the optical system hereinafter) is changed.

An image pickup element used by the camera 3 typically has a greater number of pixels than that of the monitor 5 serving as a display medium. Accordingly, between the first state and the second state, pixels in an image signal generated by the image pickup element of the camera 3 are thinned out and the image is displayed on the monitor 5. The first state is a state on which the observation scope has the size of the original observation scope (the electronic scaling ratio is 1×) of the image signal generated by the image pickup element of the camera 3. The second state is a state on which the electronic scaling ratio is lower than an electronic scaling ratio that results in the number of pixels satisfying a certain condition. The certain condition is on which the number of the pixels of a used image pickup element is equal to the number of the pixels of the monitor 5 (pixel-to-pixel display). The value of the electronic scaling ratio specifies the number of the pixels that are to be thinned out, and the lower the electronic scaling ratio is, the more the pixels are thinned out.

The above relationship leads to a situation where if the electronic scaling ratio is lower than the electronic scaling ratio leading to the pixel-to-pixel display, the resolution necessary to display the generated image signal on the monitor 5 is lower than the resolution (the number of the pixels) of the image pickup element of the camera 3. This indicates that when the electronic scaling ratio is lower than the electronic scaling ratio that leads to the pixel-to-pixel display, the resolution of the optical system that the objective 2 needs in order to display the image on the monitor 5 is lower than the resolution of the image pickup element and also that the needed resolution changes in accordance with the electronic scaling ratio.

The numerical aperture control unit 11 of the present invention performs numerical aperture changing control in which the diaphragm diameter of the variable aperture diaphragm 4 is changed in accordance with the observation scope changing process, i.e., the electronic scaling ratio, in such a manner that the resolution of the optical system of the objective 2 is equal to the resolution necessary to display the image on the monitor 5. In an example of numerical aperture changing control, the variable aperture diaphragm 4 is controlled to increase the numerical aperture when the observation scope is to be narrowed, i.e., the electronic scaling ratio is to be changed to a magnification scaling ratio. When the observation scope is to be expanded, i.e., when the electronic scaling ratio is to be changed to a reduction scaling ratio, the variable aperture diaphragm 4 is controlled in such a manner that the numerical aperture is reduced. Also, the variable aperture diaphragm 4 has the smallest diaphragm diameter when the observation scope is largest, e.g., when the scope is specified by the length of the diagonal of the image pickup element. The variable aperture diaphragm 4 has the largest diaphragm diameter when the observation scope is smallest, e.g., when the scope has a size specified by the number of the pixels used by the image pickup element that is utilized for the pixel-to-pixel display in the monitor 5. In other words, a margin by which the diaphragm diameter of the variable aperture diaphragm 4 is changed (a margin by which the observation scope is changed) may be determined in accordance with the number of the pixels of the image pickup element included in the camera 3 that is to be used and the number of the pixels of the monitor 5 that is to be used.

Performing numerical aperture changing control such as this makes it possible to control the variable aperture diaphragm 4 in the objective 2 in such a manner that necessary resolution of the optical system is maintained in respective states (with the respective electronic scaling ratios) in which the observation scope has been changed. Thus, even when the observation scope is changed by a large margin, sample S can be observed satisfactorily.

Next, an objective is discussed that is optically designed in such a manner for example that the resolution of the optical system has a value necessary for an observation of a small observation scope (i.e. for high magnification observation). It is assumed that the objective does not have a unit such as a variable aperture diaphragm etc. to change the numerical aperture. There is a problem in which the brightness around the image is insufficient when the observation scope is expanded (when the electronic scaling ratio is changed to a reduction scaling ratio) in an objective such as this. As described above, the problem of the brightness becomes serious when electronic scaling is performed to change an observation scope by a large margin in a configuration having an optical system with fixed resolution. Meanwhile, a configuration of changing the resolution of the optical system such as in the present invention can adjust the resolution of the optical system to an appropriate value in such a manner that the change in the observation scope will not cause the insufficiency of the brightness and that resolution necessary to perform observation is maintained.

Further, the observation device 100 according to the present invention changes the observation scope through an electronic scaling process, eliminating the necessity for the provision of a zooming optical system or a plurality of objectives etc. with different magnifications for switching, and the device size can be reduced. Further, an electronic scaling process neither physically move the optical elements nor switch between them, but only changes the diaphragm diameter of the aperture blades, making it possible to perform observation speedily and quietly. It is more desirable to use a variable aperture diaphragm that electrically changes a diameter allowing the passage of light such as a transmissive liquid crystal element etc.

As described above, in an observation of sample S that uses the observation device 100, the numerical aperture is changed (control of the variable aperture diaphragm 4 is performed) by a large margin when the observation scope is to be changed by a large margin. Therefore, because a change in the diaphragm diameter of the variable aperture diaphragm 4 causes a large change in the height of a ray passing through the optical system in the objective 2, it is demanded that a lens for guiding light satisfactorily even in conditions with different diaphragm diameters of the variable aperture diaphragm 4 be designed in order to achieve the above effects of the observation device 100. The objective 2 according to the present invention has a configuration that guides light satisfactorily in conditions with different diaphragm diameters of the variable aperture diaphragm 4 of the objective 2 and enables the observation device 100 to fully achieve its effects. Hereinafter, the explanations will be given for examples of the features and the specific configuration of the objective 2 of the present invention. Note that it is an object of the present invention to provide an objective advantageous to an observation device that can change the observation scope at a high speed and by a large margin while maintaining necessary observation image performance.

First, explanations will be given for the configuration and the operations that are common to the objectives (objective 2a and objective 2b, which will be described later) according to the respective embodiments of the present invention.

The objective 2 according to each example of the present invention includes a lens group that has a positive refractive power and that includes, in order starting from the object (sample S) side, a single lens having the concave surface on the object side and the variable aperture diaphragm 4 that changes the numerical aperture on the exit side of the objective. An objective with a magnification equal to or greater than 4× and equal to or lower than 20× is used as the objective 2.

Also, the objective 2 is configured to satisfy the conditional expression below.

$$3 \leq |fa/fGS| \leq 10 \quad (1)$$

In the expression, fa is the focal length of the single lens and the fGS is the focal length of a lens group between the object plane and the variable aperture diaphragm 4.

Conditional expression (1) specifies a power of the single lens, which is a front lens, with respect to a lens group closer to the sample S than the variable aperture diaphragm 4 is. When the value is lower than the lower limit of the conditional expression, the power of the front lens is too high with respect to a lens group closer to the sample S than the variable aperture diaphragm 4 is. This results in insufficient convergence of light when the image height is low with narrowed variable aperture diaphragm 4, deteriorating the observation performance although light can be guided satisfactorily when the image height is high with the widened variable aperture diaphragm 4. In other words, an observation with an expanded observation scope is hindered. When the value is greater than the upper limit of the conditional expression, the power of the front lens is too low with respect to a lens group closer to the sample S than the variable aperture diaphragm 4 is. This results in an insufficient power when the image height is high with widened variable aperture diaphragm 4, deteriorating the observation performance although light can be guided satisfactorily when the image height is low with the narrowed variable aperture diaphragm 4. In other words, an observation with a narrowed observation scope is hindered.

Satisfying conditional expression (1) above makes it possible to satisfactorily guide light both with the widened variable aperture diaphragm 4 and the narrowed variable aperture diaphragm 4.

Also, the lens group of the objective 2 may be designed in such a manner that a first lens group and a second lens group constitute an infinity optical system. The first lens group is arranged on the object side of the portion with the largest lens-surface interval of the lens group, includes the above single lens and the variable aperture diaphragm 4, and has a positive refractive power. The second lens group is arranged on the image side of the portion with the largest lens-surface interval of the lens group and has a positive refractive power. "The first lens group and the second lens group constitute an infinity optical system" described herein refers to a state in which a parallel flux is guided from the first lens group to the second lens group. The formation of the infinity optical system by the first lens group and the second lens group prevents the deterioration of the observation performance even when the distance between the first lens group and the second lens group is long. This results in greater expandability than when the first lens group and the second lens group constitute a finite optical system, i.e., when a convergent flux or divergent flux is guided between the first lens group and the second lens group. A constituent such as an element for segmenting the optical path, a light projection tube, etc. may be added between the first lens group and the second lens group in order to add a new function.

Note that the first lens group and the second lens group may constitute a finite optical system, and in such a case, the entire observation device 100 can be smaller in size than when the first lens group and the second lens group is designed as an infinity optical system.

Also, it is desirable that the objective 2 be configured to satisfy the conditional expression below.

$$1.5 \leq |Lhg1/Lhg2| \leq 3.5 \quad (2)$$

In the conditional expression, Lhg1 is the maximum ray height in the first lens group resulting when the variable aperture diaphragm 4 is widened to the maximum extent and Lhg2 is the maximum ray height in the second lens group resulting when the variable aperture diaphragm 4 is widened to the maximum extent.

Conditional expression (2) specifies a maximum ray height in each of the first lens group and the second lens group that results when the variable aperture diaphragm 4 is widened to the maximum extent. When the value is lower than the lower limit of the conditional expression, the power of the first lens group is too low with respect to that of the second lens group, making it impossible to suppress the occurrence of a spherical aberration and a comatic aberration in the objective 2. When the value is higher than the upper limit of the conditional expression, the power of the first lens group is too high with respect to that of the second lens group, making it impossible to suppress the occurrence of a spherical aberration and a comatic aberration in the objective 2.

It is desirable that the objective 2 be configured to satisfy the conditional expression below.

$$0.2 \leq |Shg1/Shg2| \leq 0.8 \quad (3)$$

In the expression, Shg1 is the maximum ray height in the first lens group resulting when the variable aperture diaphragm 4 is narrowed to the maximum extent permitted by the structure and Shg2 is the maximum ray height in the second lens group resulting when the variable aperture diaphragm 4 is narrowed to the maximum extent permitted by the structure.

Note that "narrowed to the maximum extent permitted by the structure" refers to a state in which the variable aperture diaphragm 4 is narrowed to the maximum extent permitted by the structure in the observation device 100 while keeping it possible to perform observation. Specifically, it is not possible to pick up an image of an observation scope that is larger than an observation scope specified by the length of a diagonal of the image pickup element of the camera 3 that is used. Therefore, the state in which the variable aperture diaphragm 4 has the diaphragm diameter when the resolution of the optical system is the resolution necessary to display, on the monitor 5, the image signals of an observation scope specified by the length of a diagonal of the image pickup element corresponds to a state in which the variable aperture diaphragm 4 is narrowed to the maximum extent permitted by the structure while keeping it possible to perform observation.

Conditional expression (3) specifies a maximum ray height in each of the first lens group and the second lens group resulting when the variable aperture diaphragm 4 is narrowed to the maximum extent permitted by the structure. When the value is lower than the lower limit of the conditional expression, the power of the first lens group is too low with respect to that of the second lens group, making it impossible to suppress the occurrence of a spherical aberration and a comatic aberration in the objective 2. When the value is higher than the upper limit of the conditional expression, the power of the first lens group is too high with respect to that of the second lens group, making it impossible to suppress the occurrence of a spherical aberration and a comatic aberration in the objective 2.

It is desirable that the objective 2 be configured to satisfy the conditional expression below.

$$0.3 \leq NAL*\Phi L/NAS*\Phi S \leq 0.8 \quad (4)$$

In the conditional expression, NAL is the numerical aperture on the entrance side of the objective 2 with the variable aperture diaphragm 4 widened to the maximum extent and ΦL is the area of the observation scope resulting when the variable aperture diaphragm 4 is widened to the maximum extent. NAS is the numerical aperture on the entrance side of the objective 2 with the variable aperture diaphragm 4 narrowed to the maximum extent permitted by the structure and ΦS is the area of the observation scope resulting when the variable aperture diaphragm 4 is narrowed to the maximum extent permitted by the structure.

Conditional expression (4) specifies relationships between the areas of the observation scope resulting when the variable aperture diaphragm 4 is widened to the maximum extent and the variable aperture diaphragm 4 is narrowed to the maximum extent permitted by the structure and the numerical aperture on the entrance side specified by the diaphragm diameter of the variable aperture diaphragm 4. When the value is lower than the lower limit of the conditional expression, the margin by which the numerical aperture is changed is too small with respect to the margin by which the area of the observation scope is changed, making it impossible to achieve appropriate resolution of the optical system at the upper and lower limits of the area of the observation scope. When the value is higher than the upper limit of the conditional expression, the margin by which the numerical aperture is changed is too large with respect to the margin by which the area of the observation scope is changed, and this may result in insufficient resolution at the upper limit of the area of the observation scope and insufficient brightness at the lower limit of the area of the observation scope.

Also, an arbitrary combination of conditional expressions selected from among conditional expressions (2) through (4) may be applied to the objective 2 which satisfies conditional expression (1) and in which the first lens group and the second lens group are designed as an infinity optical system or a finite optical system.

The above objective 2 makes it possible to fully deliver the effect, of the observation device 100, of making it possible to change the observation scope by a large margin and at a high speed while maintaining necessary observation image performance.

Thus, the observation device according to the present invention makes it possible to change the observation scope at a high speed and by a large margin while maintaining necessary observation performance.

Hereinafter, specific explanations will be given for the examples of the configuration of the objective 2.

Example 1

Figure 3:
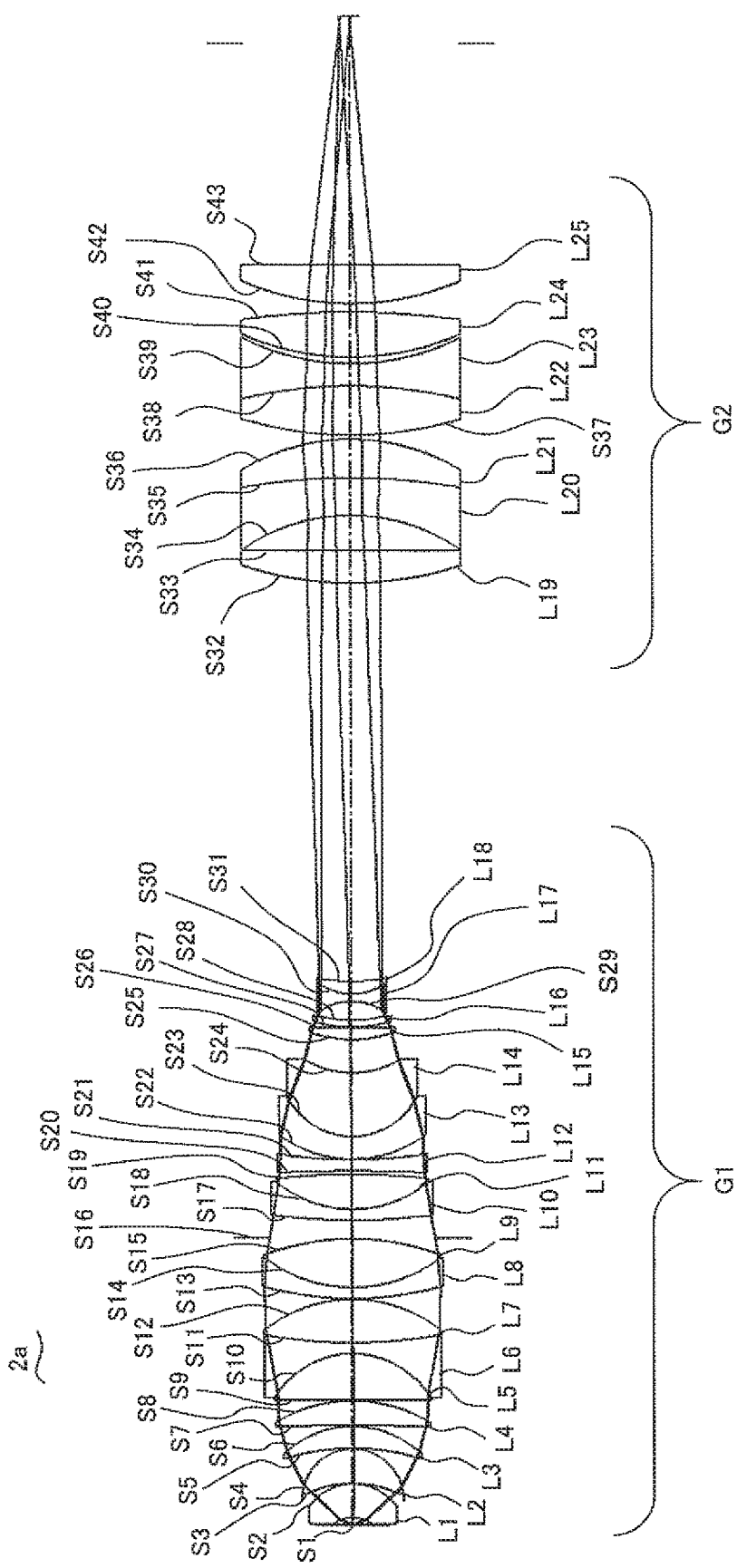
FIG. 3 is a sectional view of an objective with the diaphragm diameter of a variable aperture diaphragm widened to the maximum extent according to example 1.

FIG. 3 is a sectional view of an objective 2a according to the present example. The objective 2a includes two lens groups, i.e., first lens group G1 on the object side and second lens group G2 on the image side, first lens group G1 and second lens group G2 being separated by the portion with the largest lens-surface interval.

First lens group G1 is a lens group that has a positive refractive power and that includes, in order starting from the object side, single lens L1 having the concave surface on the object side and the variable aperture diaphragm 4 that changes the numerical aperture on the exit side of the objective 2a. In more detail, first lens group G1 includes, in order starting from the object side, single lens L1 having the concave surface on the object side and the convex surface on the image side, single lenses L2, L3 and L4 each having the concave surface on the object side and the convex surface on the image side, a cemented lens including lenses L5, L6 and L7 and having the convex surfaces on the object side and the image side, a cemented lens including lenses L8 and L9 and having the convex surfaces on the object side and the image side, the variable aperture diaphragm 4, a cemented lens including lenses L10 and L11 and having the convex surfaces on the object side and the image side, single lens L12 having the concave surfaces on the object side and the image side, a cemented lens including lenses L13 and L14 and having the convex surface on the object side and the concave surface on the image side, single lenses L15 and L16 each having the convex surface on the object side and the concave surface on the image side, and a cemented lens including lenses L17 and L18 and having the concave surface on the object side and the concave surface on the image side.

Second lens group G2 is a lens group having a positive refractive power. In more detail, second lens group G2 includes plano-convex lens L19, a cemented meniscus lens, a cemented lens, biconvex single lens L24 and plano-convex lens L25. The plano-convex lens L19 has the convex surface on the object side. The cemented meniscus lens includes lenses L20 and L21 and has the concave surface on the object side and the convex surface on the image side. The cemented lens includes lenses L22 and L23 and has the convex surface on the object side and the concave surface on the image side. The plano-convex lens L25 has the convex surface on the object side. Second lens group G2 guides the light from first lens group G1 and forms an image on the image pickup element included in the camera 3.

Also, first lens group G1 and second lens group G2 constitute an infinity optical system. FIG. 3 is also a sectional view of the objective 2a with the diaphragm diameter of the variable aperture diaphragm 4 widened to the maximum extent.

Hereinafter, the various types of data belonging to the objective 2a according to the present example will be described.

the objective 2a has the lens data as below.

| s | r | d | nd | vd |
|---|---|---|---|---|
| 1 | −9.2327 | 9.2968 | 1.883 | 40.76 |
| 2 | −15.4571 | 0.2424 | 1 | |
| 3 | −28.8411 | 9.4622 | 1.43875 | 94.66 |
| 4 | −14.3165 | 0.2000 | 1 | |
| 5 | −62.0701 | 6.0200 | 1.43875 | 94.66 |
| 6 | −27.8738 | 0.2000 | 1 | |
| 7 | −1096.6506 | 6.8118 | 1.43875 | 94.66 |
| 8 | −42.4702 | 0.2000 | 1 | |
| 9 | 9291.3843 | 12.8532 | 1.43875 | 94.66 |
| 10 | −25.3849 | 3.0000 | 1.63775 | 42.41 |
| 11 | 144.6885 | 12.0010 | 1.43875 | 94.66 |
| 12 | −39.5201 | 0.2000 | 1 | |
| 13 | 95.2340 | 3.0000 | 1.63775 | 42.41 |
| 14 | 40.3103 | 13.4871 | 1.43875 | 94.66 |
| 15 | −70.6084 | 0.11 | 1 | |
| 16 | INF | 5.0000 | 1 | |
| 17 | 176.3671 | 3.0000 | 1.63775 | 42.41 |
| 18 | 33.3026 | 9.7525 | 1.43875 | 94.66 |
| 19 | −189.2251 | 0.8852 | 1 | |
| 20 | −412.4946 | 3.0000 | 1.673 | 38.15 |
| 21 | 125.3108 | 0.2000 | 1 | |
| 22 | 34.1104 | 6.2868 | 1.48749 | 70.23 |
| 23 | 20.3892 | 17.6210 | 1.738 | 32.26 |
| 24 | 26.4175 | 9.1703 | 1 | |
| 25 | 35.4405 | 3.1972 | 1.63775 | 42.41 |
| 26 | 270.1694 | 0.2000 | 1 | |
| 27 | 36.1718 | 2 | 1.497 | 81.54 |
| 28 | 42.6134 | 5.1879 | 1 | |
| 29 | −15.5207 | 2 | 1.497 | 81.54 |
| 30 | 16.5194 | 3.4395 | 1.63775 | 42.41 |
| 31 | 47.5260 | 110 | 1 | |
| 32 | 97.5476 | 9 | 1.48749 | 70.23 |
| 33 | INF | 9.72 | 1 | |
| 34 | −53.1641 | 10.2937 | 1.65412 | 39.68 |
| 35 | −175.5686 | 10.6875 | 1.5927 | 35.31 |
| 36 | −58.8915 | 1.125 | 1 | |
| 37 | 106.7231 | 13.59 | 1.497 | 81.54 |
| 38 | −130.0601 | 6.075 | 1.65412 | 39.68 |
| 39 | 67.3672 | 1.8225 | 1 | |
| 40 | 76.0016 | 12.465 | 1.43875 | 94.93 |
| 41 | −222.9131 | 2.3287 | 1 | |
| 42 | 77.3764 | 10.6875 | 1.48749 | 70.23 |
| 43 | INF | 68.6584 | 1 | |

In the above, s represents a surface number, r represents a curvature radius (mm), d represents a surface interval (mm), nd represents a refractive index with respect to a d-line, and vd represents an Abbe number. Surface number s1 represents the first surface of single lens L1, which exists closest to the object from among the lenses included in first lens group G1. Surface number s16 represents the position of the variable aperture diaphragm 4. Surface interval d31 represents the interval between first lens group G1 and second lens group G2.

The objective 2a has magnification β that satisfies the expression below.

$$\beta = -9.9998$$

Hereinafter, explanations will be given for various types of data belonging to the objective 2a with the diaphragm diameter of the variable aperture diaphragm 4 widened to the maximum extent. Numerical aperture NA on the object side and image height h (mm) are as below.

$$NA=0.95, h=2.8$$

Figure 4:
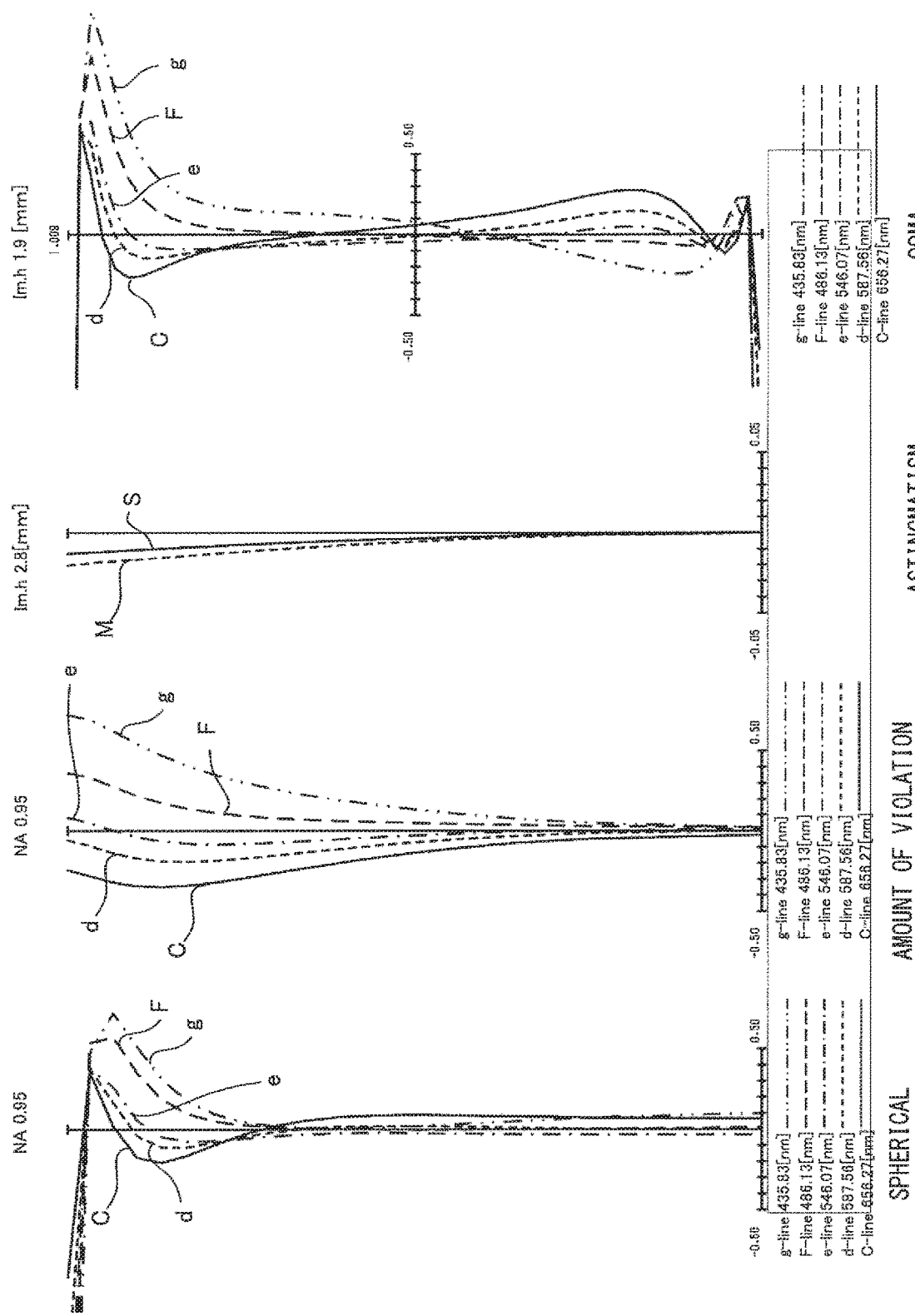
FIG. 4A is a spherical aberration diagram with the diaphragm diameter of the variable aperture diaphragm widened to the maximum extent in the objective according to example 1.
FIG. 4B is a sine condition violation amount diagram with the diaphragm diameter of the variable aperture diaphragm widened to the maximum extent in the objective according to example 1.
FIG. 4C is an astigmatism diagram with the diaphragm diameter of the variable aperture diaphragm widened to the maximum extent in the objective according to example 1.
FIG. 4D is a comatic aberration diagram with the diaphragm diameter of the variable aperture diaphragm widened to the maximum extent in the objective according to example 1.

FIG. 4A through FIG. 4D are aberration diagrams of the objective 2a with the diaphragm diameter of the variable aperture diaphragm 4 widened to the maximum extent according to the present example, and illustrate aberrations on the imaging plane on the image side. FIG. 4A is a spherical aberration diagram, FIG. 4B is a sine condition violation amount diagram, FIG. 4C is an astigmatism diagram, and FIG. 4D is a comatic aberration diagram. All of the diagrams illustrate that the aberrations have satisfactorily been corrected. In the diagrams, C denotes a C-line, d denotes a d-line, F denotes an F-line, g denotes a g-line, e denotes an e-line, NA denotes a numerical aperture on the object side, and Im.h denotes an image height.

Figure 5:
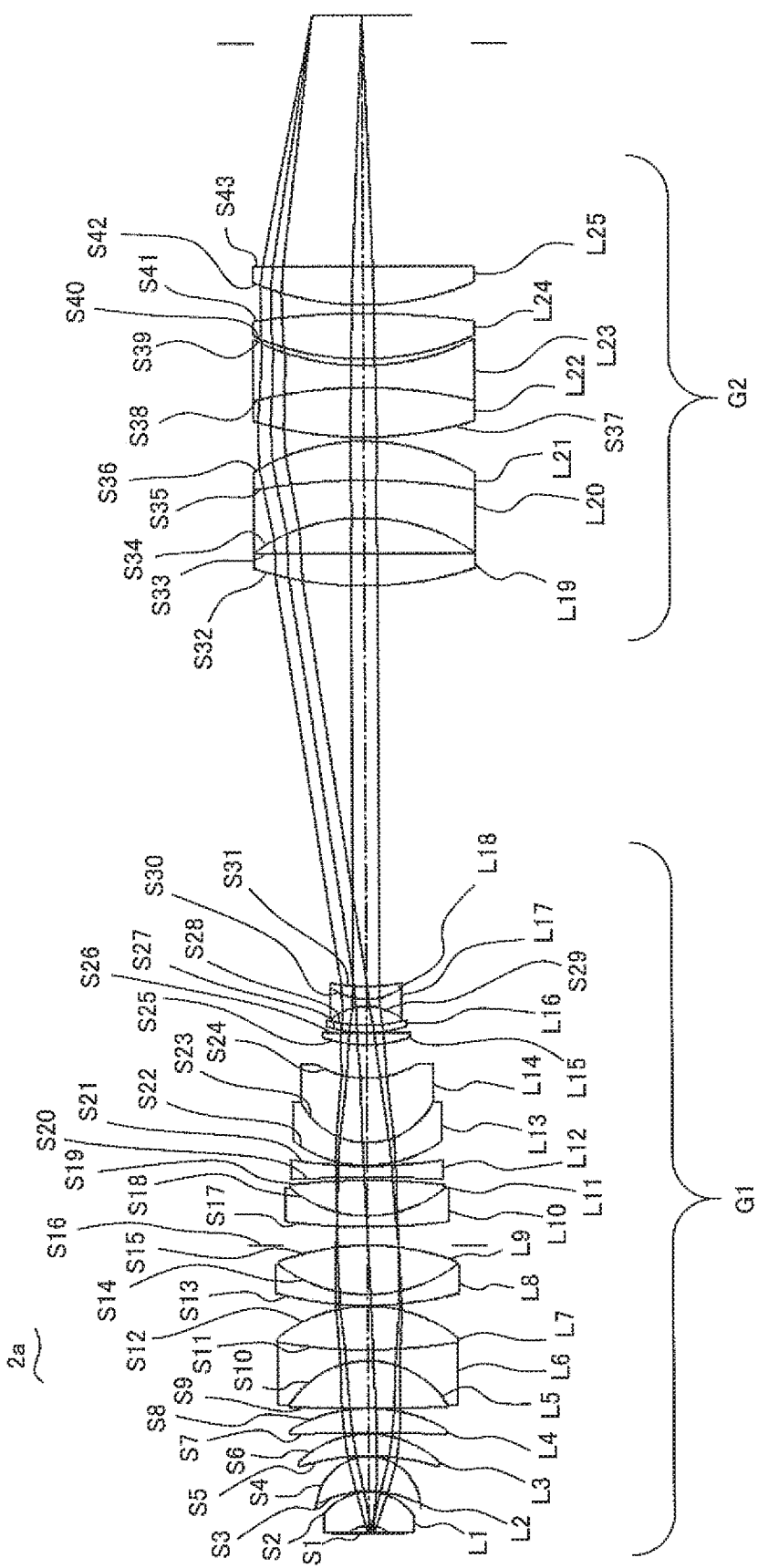
FIG. 5 is a sectional view of an objective with the diaphragm diameter of the variable aperture diaphragm narrowed to the maximum extent permitted by the structure according to example 1.

Hereinafter, various types of data belonging to the objective 2a with the diaphragm diameter of the variable aperture diaphragm 4 narrowed to the maximum extent permitted by the structure will be described. FIG. 5 is a sectional view of the objective 2a with the diaphragm diameter of the variable aperture diaphragm 4 narrowed to the maximum extent permitted by the structure. Numerical aperture NA on the object side and image height h (mm) are as below.

$$NA=0.4, h=13.7$$

Figures 6A, 6B, 6C, 6D:
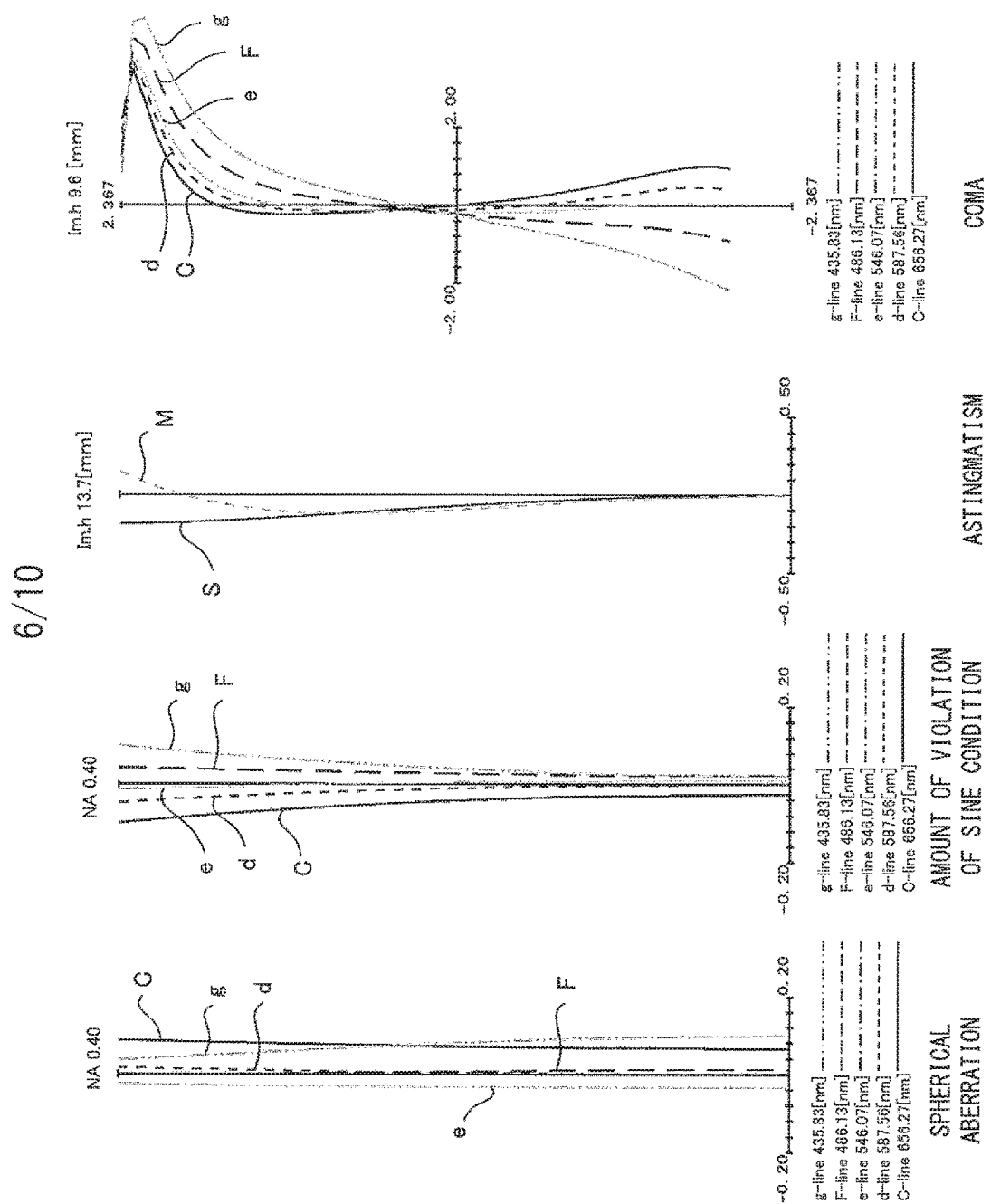
FIG. 6A is a spherical aberration diagram with the diaphragm diameter of the variable aperture diaphragm narrowed to the maximum extent permitted by the structure in the objective according to example 1.
FIG. 6B is a sine condition violation amount diagram with the diaphragm diameter of the variable aperture diaphragm narrowed to the maximum extent permitted by the structure in the objective according to example 1.
FIG. 6C is an astigmatism diagram with the diaphragm diameter of the variable aperture diaphragm narrowed to the maximum extent permitted by the structure in the objective according to example 1.
FIG. 6D is a comatic aberration diagram with the diaphragm diameter of the variable aperture diaphragm narrowed to the maximum extent permitted by the structure in the objective according to example 1.

FIG. 6A through FIG. 6D are aberration diagrams of the objective 2a with the diaphragm diameter of the variable aperture diaphragm 4 narrowed to the maximum extent permitted by the structure according to the present example, and illustrate aberrations on the imaging plane on the image side. FIG. 6A is a spherical aberration diagram, FIG. 6B is a sine condition violation amount diagram, FIG. 6C is an astigmatism diagram, and FIG. 6D is a comatic aberration diagram. All of the diagrams illustrate that the aberrations have satisfactorily been corrected. In the diagrams, C denotes a C-line, d denotes a d-line, F denotes an F-line, g denotes a g-line, e denotes an e-line, NA denotes a numerical aperture on the object side, and Im.h denotes an image height.

The objective 2a according to example 1 described above satisfies conditional expressions (1) through (4) as expressed by expressions (A1) through (A4) below. Note that expressions (A1) through (A4) respectively correspond to conditional expressions (1) through (4).

$$|fa/fGS|=4.15 \tag{A1}$$

$$|Lhg1/Lhg2|=1.80 \tag{A2}$$

$$|Shg1/Shg2|=0.32 \tag{A3}$$

$$NAL*\Phi L/NAS*\Phi S=0.48 \tag{A4}$$

The values of the parameters used for expressions (A1) through (A4) are as below.

$$fa=-86.6695 \text{ (mm)}$$

$$fGS=20.8805 \text{ (mm)}$$

$$Lhg1=-24.605 \text{ (mm)}$$

$$Lhg2=13.656 \text{ (mm)}$$

$$Shg1=-9.128 \text{ (mm)}$$

$$Shg2=28.915 \text{ (mm)}$$

$$NAL=0.95$$

$$\Phi L=0.28 (\text{mm}^2)$$

$$NAS=0.4$$

$$\Phi S=1.373 (\text{mm}^2)$$

Example 2

Figure 7:
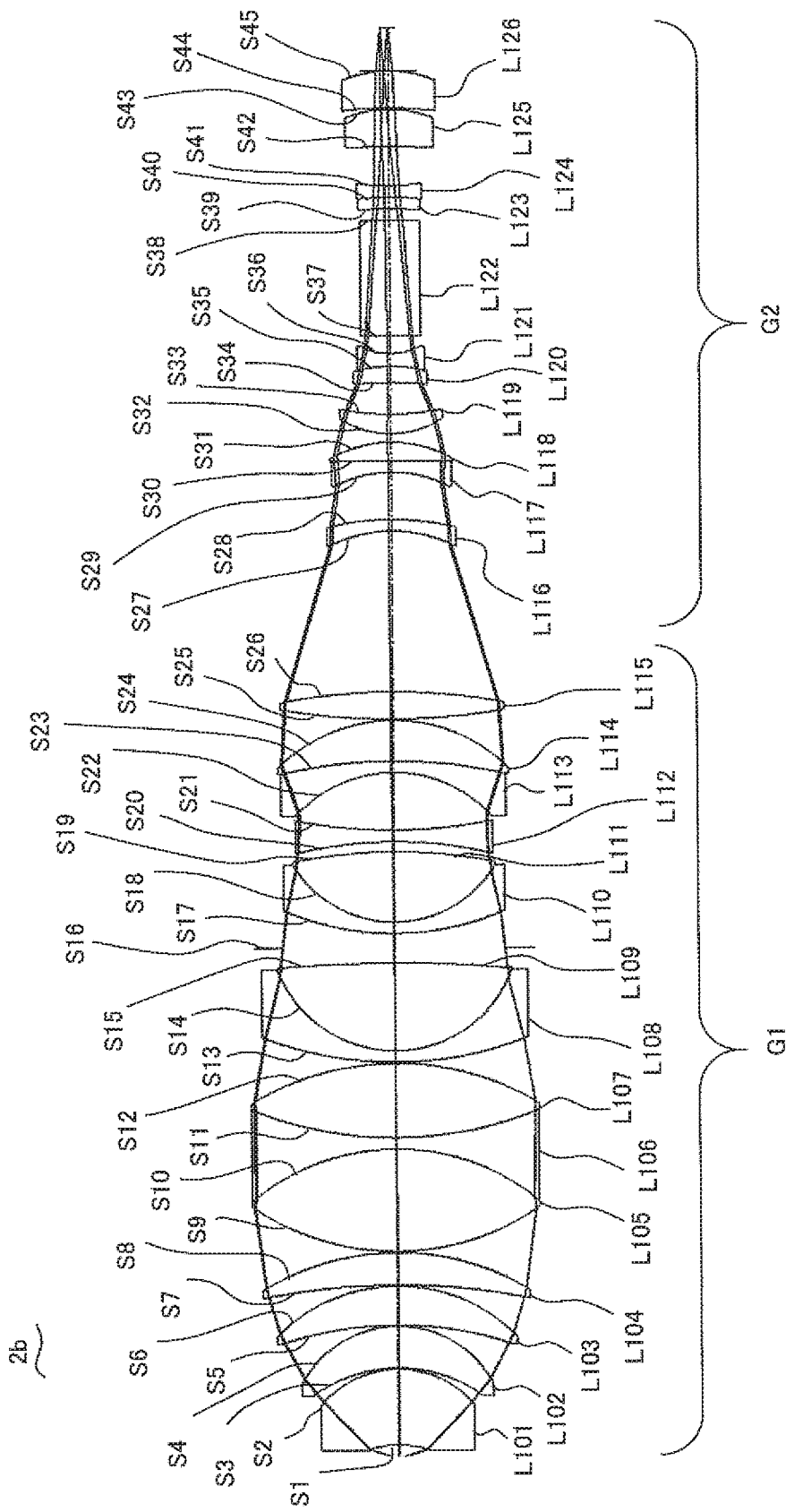
FIG. 7 is a sectional view of an objective with the diaphragm diameter of the variable aperture diaphragm widened to the maximum extent according to example 2.

FIG. 7 is a sectional view of an objective 2b according to the present example. The objective 2b is different from the objective 2a explained in example 1 in that first lens group G1 and second lens group G2 constitute a finite optical system in the objective 2b.

In the objective 2b, first lens group G1 is a lens group having a positive refractive power and including, in order starting from the object side, single lens L101 having the concave surface on the object side and the convex surface on the image side, single lenses L102, L103 and L104 each having the concave surface on the object side and the convex surface on the image side, a cemented lens including lenses L105, L106 and L107 and having the convex surfaces on the object side and the image side, a cemented lens including lenses L108 and L109 and having the convex surfaces on the object side and the image side, the variable aperture diaphragm 4, a cemented lens including lenses L110 and L111 and having the convex surfaces on the object side and the image side, single lens L112 having the concave surfaces on the object side and the image side, a cemented lens including lenses L113 and L114 and having the concave surface on the object side and the convex surface on the image side, and single lens L115 having the convex surfaces on the object side and the image side.

Second lens group G2 is a lens group having a positive refractive power and including, in order starting from the object side, a single lens L116 having the concave surface on the object side and the convex surface on the image side, a cemented lens including lenses L117 and L118 and having the concave surface on the object side and the convex surface on the image side, a single lens L119 having the convex surface on the object side and the concave surface on the image side, a cemented lens including lenses L120 and L121 and having the concave surfaces on the object side and the image side, planar lens L122, a cemented lens including lenses L123 and L124 and having the concave surfaces on the object side and the image side, and single lenses L125 and L126 each having the concave surface on the object side and the convex surface on the image side. Second lens group G2 guides the light from first lens group G1 and forms an image on the image pickup element included in the camera 3. FIG. 7 is also a sectional view of the objective 2b with the diaphragm diameter of the variable aperture diaphragm 4 widened to the maximum extent.

Hereinafter, the various types of data belonging to the objective 2b according to the present example will be described.

the objective 2b has the lens data as below.

| s | r | d | nd | vd |
|---|---|---|---|---|
| 1 | −15.7874 | 13.2030 | 1.883 | 40.76 |
| 2 | −17.4245 | 0.2000 | 1 | |
| 3 | −25.0740 | 7.2662 | 1.43875 | 94.66 |
| 4 | −19.0267 | 0.2000 | 1 | |
| 5 | −64.3046 | 6.8340 | 1.43875 | 94.66 |
| 6 | −29.4799 | 0.2000 | 1 | |
| 7 | −117.2814 | 5.6382 | 1.43875 | 94.66 |
| 8 | −45.0975 | 0.2000 | 1 | |
| 9 | 44.5879 | 17.8815 | 1.43875 | 94.66 |
| 10 | −39.5690 | 2 | 1.63775 | 42.41 |
| 11 | 67.8914 | 12.9710 | 1.43875 | 94.66 |
| 12 | −49.2804 | 0.2000 | 1 | |
| 13 | 64.4278 | 2 | 1.63775 | 42.41 |
| 14 | 22.0518 | 15.3764 | 1.43875 | 94.66 |
| 15 | −225.5900 | 2.61 | 1 | |
| 16 | INF | 2.5000 | 1 | |
| 17 | 48.5822 | 2 | 1.63775 | 42.41 |
| 18 | 20.7164 | 12.2900 | 1.43875 | 94.66 |
| 19 | −87.6362 | 1.7451 | 1 | |
| 20 | −73.6626 | 2 | 1.673 | 38.15 |

-continued

| s | r | d | nd | vd |
|---|---|---|---|---|
| 21 | 88.9031 | 10.0784 | 1 | |
| 22 | −23.2057 | 2 | 1.48749 | 70.23 |
| 23 | −87.5439 | 7.1224 | 1.738 | 32.26 |
| 24 | −28.6909 | 0.2000 | 1 | |
| 25 | 116.0267 | 4.7829 | 1.63775 | 42.41 |
| 26 | −105.5646 | 28.0817 | 1 | |
| 27 | −24.7390 | 2 | 1.497 | 81.54 |
| 28 | −49.0927 | 8.2741 | 1 | |
| 29 | −21.4764 | 2 | 1.497 | 81.54 |
| 30 | −638.2134 | 3.2198 | 1.63775 | 42.41 |
| 31 | −21.6251 | 1.5 | 1 | |
| 32 | 16.6718 | 3.4023 | 1.48749 | 70.23 |
| 33 | 45.5680 | 5.5449 | 1 | |
| 34 | −61.3090 | 2.8133 | 1.65412 | 39.68 |
| 35 | −23.7084 | 2.2181 | 1.5927 | 35.31 |
| 36 | 11.2792 | 3.1496 | 1 | |
| 37 | INF | 20 | 1.56883 | 56.36 |
| 38 | INF | 2.1424 | 1 | |
| 39 | −59.5450 | 2.0000 | 1.497 | 81.54 |
| 40 | −46.6395 | 2.0000 | 1.65412 | 39.68 |
| 41 | 36.8452 | 6.8150 | 1 | |
| 42 | −151.1060 | 6.5266 | 1.43875 | 94.93 |
| 43 | −20.1708 | 0.2000 | 1 | |
| 44 | −82.8114 | 6.4615 | 1.48749 | 70.23 |
| 45 | −21.6367 | 7.5584 | 1 | |

In the above, s represents a surface number, r represents a curvature radius (mm), d represents a surface interval (mm), nd represents a refractive index with respect to a d-line, and vd represents an Abbe number. Surface number s1 represents the first surface of single lens L101, which exists closest to the object from among the lenses included in first lens group G1. Surface number s16 represents the position of the variable aperture diaphragm 4. Surface interval d26 represents the interval between first lens group G1 and second lens group G2.

The objective 2a has magnification β that satisfies the expression below.

β=−10

Hereinafter, explanations will be given for various types of data belonging to the objective 2b with the diaphragm diameter of the variable aperture diaphragm 4 widened to the maximum extent. Numerical aperture NA on the object side and image height h (mm) are as below.

NA=0.95,h=2.8

Figure 8:
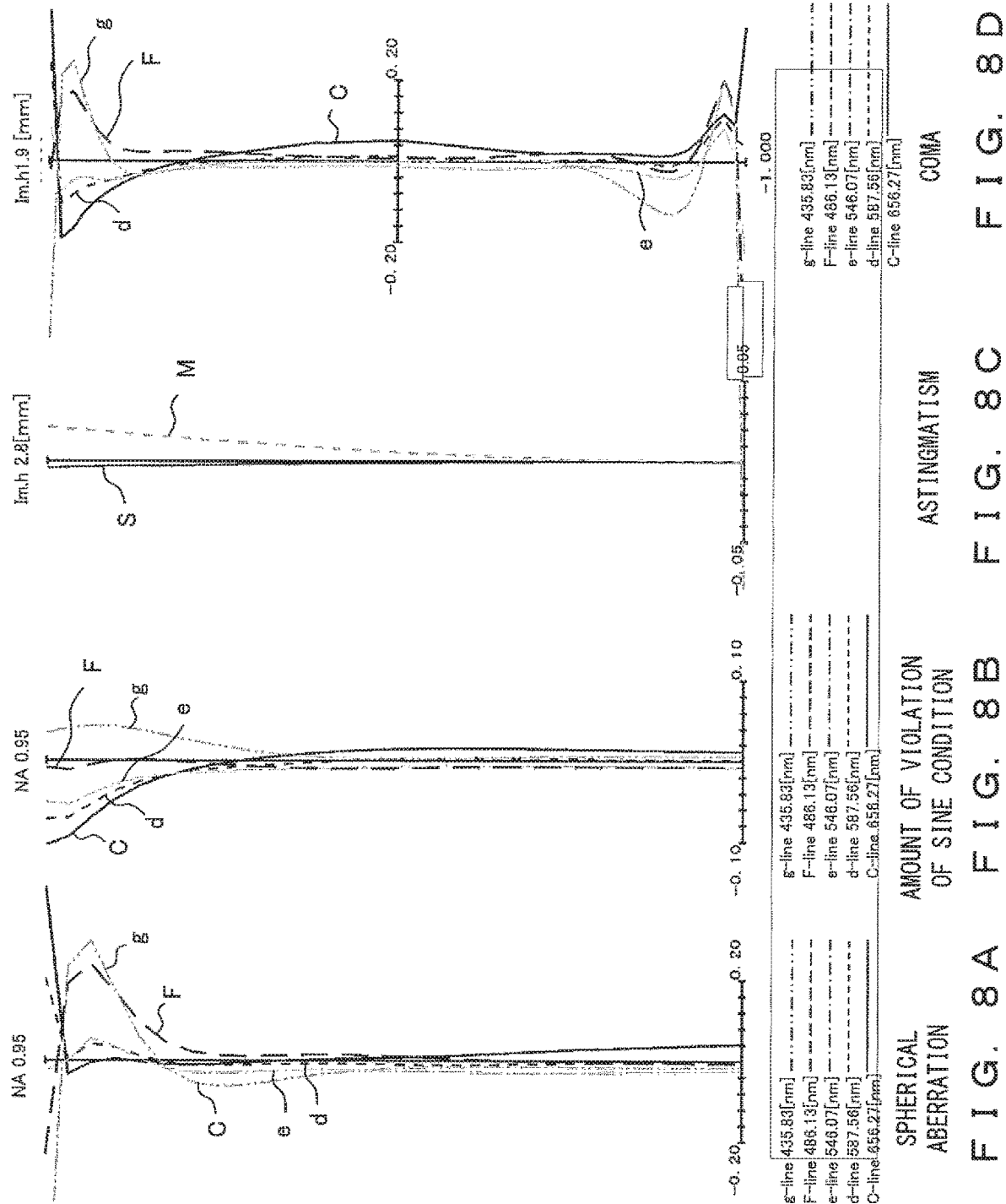
FIG. 8A is a spherical aberration diagram with the diaphragm diameter of the variable aperture diaphragm widened to the maximum extent in the objective according to example 2.
FIG. 8B is a sine condition violation amount diagram with the diaphragm diameter of the variable aperture diaphragm widened to the maximum extent in the objective according to example 2.
FIG. 8C is an astigmatism diagram with the diaphragm diameter of the variable aperture diaphragm widened to the maximum extent in the objective according to example 2.
FIG. 8D is a comatic aberration diagram with the diaphragm diameter of the variable aperture diaphragm widened to the maximum extent in the objective according to example 2.

FIG. 8A through FIG. 8D are aberration diagrams of the objective 2b with the diaphragm diameter of the variable aperture diaphragm 4 widened to the maximum extent according to the present example, and illustrate aberrations on the imaging plane on the image side. FIG. 8A is a spherical aberration diagram, FIG. 8B is a sine condition violation amount diagram, FIG. 8C is an astigmatism diagram, and FIG. 8D is a comatic aberration diagram. All of the diagrams illustrate that the aberrations have satisfactorily been corrected. In the diagrams, C denotes a C-line, d denotes a d-line, F denotes an F-line, g denotes a g-line, e denotes an e-line, NA denotes a numerical aperture on the object side, and Im.h denotes an image height.

Hereinafter, explanations will be given for various types of data belonging to the objective 2b with the diaphragm diameter of the variable aperture diaphragm 4 narrowed to the maximum extent permitted by the structure. FIG. 9 is a sectional view of the objective 2b with the diaphragm diameter of the variable aperture diaphragm 4 narrowed to the maximum extent permitted by the structure. Numerical aperture NA on the object side and image height h (mm) are as below.

$$NA=0.4, h=13.7$$

FIG. 10A through FIG. 10D are aberration diagrams of the objective 2b according to the present example with the diaphragm diameter of the variable aperture diaphragm 4 narrowed to the maximum extent permitted by the structure, and illustrate aberrations on the imaging plane on the image side. FIG. 10A is a spherical aberration diagram, FIG. 10B is a sine condition violation amount diagram, FIG. 10C is an astigmatism diagram, and FIG. 10D is a comatic aberration diagram. All of the diagrams illustrate that the aberrations have satisfactorily been corrected. In the diagrams, C denotes a C-line, d denotes a d-line, F denotes an F-line, g denotes a g-line, e denotes an e-line, NA denotes a numerical aperture on the object side, and Im.h denotes an image height.

The objective 2b according to example 2 described above satisfies conditional expressions (1) through (4) as expressed by expressions (B1) through (B4) below. Note that expressions (B1) through (B4) respectively correspond to conditional expressions (1) through (4).

$$|fa/fGS|=3.36 \quad (B1)$$

$$|Lhg1/Lhg2|=2.82 \quad (B2)$$

$$|Shg1/Shg2|=0.74 \quad (B3)$$

$$NAL*\Phi L/NAS*\Phi S=0.48 \quad (B4)$$

The values of the parameters used for expressions (A1) through (A4) are as below.

$$fa=68.4055 \text{ (mm)}$$

$$fGS=20.3516 \text{ (mm)}$$

$$Lhg1=-25.162 \text{ (mm)}$$

$$Lhg2=8.928 \text{ (mm)}$$

$$Shg1=-11.06 \text{ (mm)}$$

$$Shg2=14.875 \text{ (mm)}$$

$$NAL=0.95$$

$$\Phi L=0.28 (\text{mm}^2)$$

$$NAS=0.4$$

$$\Phi S=1.373 (\text{mm}^2)$$

What is claimed is:

1. An observation device for observing an object, the observation device comprising:
    an objective that forms an image with light from the object, that includes a lens group, and that has a magnification equal to or higher than 4× and equal to or lower than 20×, the lens group having a positive refractive power and including, in order starting from an object side, a single lens having a concave surface on an object side and a variable aperture diaphragm configured to change a numerical aperture on an exit side of the objective;
    an image pickup device that converts an image of the object into an image signal, the image of the object being formed by the objective;
    an observation scope changing device that performs electronic scaling on the image signal obtained by the image pickup device and thereby performs an observation scope changing process of changing an observation scope, the electronic scaling changing the observation scope by changing an amount of the image signal that is subject to electronic extraction; and
    a control device that controls the variable aperture diaphragm in accordance with the observation scope changing process,
    wherein the control device, when narrowing the observation scope or setting an electronic scaling ratio to an enlargement scaling ratio, increases a diaphragm diameter of the variable aperture diaphragm,
    wherein the control device, when enlarging the observation scope or setting the electronic scaling ratio to a reduction scaling ratio, reduces the diaphragm diameter of the variable aperture diaphragm,
    wherein, during the observation scope changing process, each lens included in the objective remains fixed in its position along an optical axis direction of the objective, and
    wherein the single lens is a front lens included in the objective that is arranged closest to the object, and the objective is configured so that the following conditional expression is satisfied:

$$3 \leq |fa/fGS| \leq 10$$

where fa is a focal length of the single lens, and fGS is a focal length of a lens group from an object plane to the variable aperture diaphragm.

2. The observation device according to claim 1, wherein the objective includes a first lens group and a second lens group, the first lens group being arranged on an object side of a portion having a largest lens-surface interval, having the single lens and the variable aperture diaphragm, and having a positive refractive power, and the second lens group being arranged on an image side of the portion having the largest lens-surface interval and having a positive refractive power.

3. The observation device according to claim 2, wherein the objective is configured so that the following conditional expression is satisfied:

$$1.5 \leq |Lhg1/Lhg2| \leq 3.5$$

where Lhg1 is a maximum ray height in the first lens group resulting when the variable aperture diaphragm is widened to a maximum extent, and Lhg2 is a maximum ray height in the second lens group resulting when the variable aperture diaphragm is widened to a maximum extent.

4. The observation device according to claim 2, wherein the objective is configured so that the following conditional expression is satisfied, $$0.2 \leq |Shg1/Shg2| \leq 0.8$$

where Shg1 is a maximum ray height in the first lens group resulting when the variable aperture diaphragm is narrowed to a maximum extent while keeping it possible to perform observation, and Shg2 is a maximum ray height in the second lens group resulting when the variable aperture diaphragm is narrowed to the maximum extent while keeping it possible to perform observation.

5. The observation device according to claim 2, wherein the objective is configured so that the following conditional expression is satisfied:

$$0.3 \leq NAL*\Phi L/NAS*\Phi S \leq 0.8$$

where NAL is a numerical aperture on an entrance side of the objective resulting when the variable aperture diaphragm is widened to a maximum extent, ΦL is an area of the observation scope resulting when the variable aperture diaphragm is widened to the maximum extent, NAS is the numerical aperture on the entrance side of the objective when the variable aperture diaphragm is narrowed to a maximum extent while keeping it possible to perform observation, and ΦS is an area of the observation scope resulting when the variable aperture diaphragm is narrowed to the maximum extent while keeping it possible to perform observation.

6. The observation device according to claim 2, wherein the first lens group and the second lens group form an infinity optical system.

7. The observation device according to claim 2, wherein the first lens group and the second lens group form a finite optical system.

\* \* \* \* \*